(12) United States Patent
Faihe

(10) Patent No.: US 7,580,906 B2
(45) Date of Patent: Aug. 25, 2009

(54) AUTOMATED ADAPTIVE COMPUTER SUPPORT SYSTEM GENERATING PROBLEM SOLUTIONS HAVING CONFIDENCE LEVELS USED TO DETERMINE WHETHER HUMAN EXPERT INTERVENTION IS REQUIRED

(75) Inventor: Yassine Faihe, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 56 days.

(21) Appl. No.: 11/831,508

(22) Filed: Jul. 31, 2007

(65) Prior Publication Data

US 2008/0040299 A1    Feb. 14, 2008

Related U.S. Application Data

(62) Division of application No. 11/099,851, filed on Apr. 6, 2005, now Pat. No. 7,257,514.

(30) Foreign Application Priority Data

Jun. 15, 2004  (EP)  .................... 04300378

(51) Int. Cl.
G06F 13/14    (2006.01)
G06F 13/38    (2006.01)
G06F 9/44     (2006.01)
G06F 11/00    (2006.01)

(52) U.S. Cl. .............. 706/14; 706/61; 714/26
(58) Field of Classification Search ........... 706/14, 706/61; 714/26
See application file for complete search history.

(56) References Cited

U.S. PATENT DOCUMENTS 5,123,017 A    6/1992  Simpkins et al.
5,367,667 A   11/1994  Wahlquist et al.
5,794,237 A    8/1998  Gore, Jr.
5,944,839 A    8/1999  Isenberg
6,260,048 B1   7/2001  Carpenter et al.
6,357,017 B1   3/2002  Bereiter et al.
2004/0249914 A1  12/2004  Flocket et al.

FOREIGN PATENT DOCUMENTS

| AU | 199537778 B2 | 5/1996 |
|----|---|---|
| EP | 0599606 | 6/1994 |
| EP | 1265144 | 12/2002 |
| WO | PCT/US96/16618 | * 11/1996 |
| WO | WO 97/15009 | 4/1997 |
| WO | PCT/US00/12731 | * 5/2000 |
| WO | WO 00/68793 | 11/2000 |
| WO | WO 03/023649 | 3/2003 |

* cited by examiner

*Primary Examiner*—David R Vincent
*Assistant Examiner*—Nathan H Brown, Jr.

(57) ABSTRACT

A solution engine of a vendor's highly-automated adaptive computer support system for a remote customer automatically generates proposed solutions, e.g., sets of support documents, as a function of diagnostic data received from a customer's computer system. The automatically generated solution can be subject to expert review prior to publication to the customer, e.g., when the automated system assigns a low confidence level to the solution. In addition, expert review can be triggered by feedback from the customer once a proposed solution is communicated. The diagnostic data, solutions and feedback for an incident are packaged as a "case" and entered into a historical case database. A solution function updater updates the solution function as a function, at least in part, of the expert review and customer feedback.

16 Claims, 3 Drawing Sheets

US 7,580,906 B2

AUTOMATED ADAPTIVE COMPUTER SUPPORT SYSTEM GENERATING PROBLEM SOLUTIONS HAVING CONFIDENCE LEVELS USED TO DETERMINE WHETHER HUMAN EXPERT INTERVENTION IS REQUIRED

CROSS-REFERENCE TO RELATED APPLICATION

This application is a divisional of U.S. utility application entitled, "Computer Support Service with Solution Function Updates as a Function of Pre-Delivery Expert Changes to Automatically Generated Solution," having Ser. No. 11/099, 851, filed Apr. 6, 2005 now U.S. Pat. No. 7,257,514, which is entirely incorporated herein by reference and which claims priority to European Patent Application entitled "Computer Support Service with Solution Function Updates as a Function of Pre-Delivery Expert Changes to Automatically Generated Solution," having serial no. 04300378.9, filed Jun. 15, 2004.

BACKGROUND OF THE INVENTION

The present invention relates to computer systems and, more particularly, to a method for a vendor to service a client computer system. The invention provides for more effective integration of automated and expert contributions to solutions for servicing a customer computer system.

Society is increasingly dependent on computer systems. Due to rapid change and complexity, users frequently experience problems. Support personnel for the hardware and software associated with the computer systems are overwhelmed by the number of phone calls for support from users and the diversity and complexities of the problems they present.

Automated support systems have been developed to help address the demand for support services. Automated systems can act as a first-line of support, handling a range of commonly occurring problems. When the automated system fails to provide an appropriate solution, it can then refer the problem to human support personnel. Such systems are disclosed by Owhadi, Eric in European Patent Application EP-A-1265144, published 11 Dec. 2002, and by Flocken et al., in U.S. patent application Ser. No. 10/442,592, filed May 21, 2003.

An automated support system can require knowledge from large numbers, e.g., millions, of documents regarding possible fixes and procedures for user problems. Methods for managing such documents so that the documents that are most likely to address a problem can be distinguished from the others are discussed in Delic, K A et al., "Knowledge harvesting, articulation, and delivery" Hewlett-Packard Journal, Hewlett-Packard Company, Palo Alto, US, vol. 49, no. 2, May 1998, (1998-05), pages 74-81, XP000865348, for instance.

Several approaches have been developed to handle the increasing demand for computer support services. In a hierarchical support system, less knowledgeable (and thus, less expensive) first-line agents can answer simple questions; problems that cannot be solved by the first-line agents can be referred to more knowledgeable (and more expensive) technicians, who are thus freed from dealing with common simple problems. An automated system that operates in a closed-loop so that it can adapt based on usage patterns and user feedback regarding the usefulness of solutions is disclosed by Delic K A et al., "Knowledge-based support services: monitoring and adaptation" Proceedings Dexa 2000, IEEE, 2000, pages 1097-1101, XP010515630.

Computer support services that use an automated front end and that provide expert human support when the automated help does not solve the problem provide a cost-effective bifurcated approach to solving customer problems. Automated help can solve most customers' problems efficiently, while personal support is still available when needed. However, for problems that the automated system cannot address effectively, a user may still be presented with a number of unhelpful solutions. A customer, who is likely to be a non-expert, may waste time and suffer discomfort in determining, for each document, that the solution it proposes is ineffective. While the problem may be solved eventually using human support, the intervening burden and discomfort can make for a distasteful customer experience. What is needed is a highly automated support system that minimizes customer exposure to unhelpful automatically generated solutions.

SUMMARY OF THE INVENTION

The present invention provides for updating a solution function of a computer support system at least in part as a function of pre-delivery expert changes to an automatically generated solution to, for example, a problem on a customer's computer. Diagnostic data can be collected on the customer's systems and sent to the vendor's computer support system. A solution engine at the remote computer support system receives the diagnostic data and automatically generates a solution as a function of the diagnostic data. An expert review function for providing the automatically generated solution to a human expert who generates an expert solution which, at least in some cases, involves changes to said automatically-generated solution. A delivery function then presents the expert solution to the customer. An updater changes the solution function at least in part in response to the changes introduced by the expert.

Preferably, automatically generated solutions are assigned confidence levels that can be used to determine whether expert intervention is desirable. Thus, when the confidence level assigned to a solution falls below a certain threshold, expert review can be triggered, whereas, in cases in which the confidence level is sufficiently high, expert review can be omitted. The present invention provides for customer feedback on the effectiveness of a solution. This feedback can be used along with expert review changes in changing the solution function.

For example, the solution engine can include a rule-based engine and the solution function can be or can include a rule-base. As cases are resolved, case data is entered into an historical case base of the updater. The updater also can include an induction engine for generating new rules or modifying old rules that are stored in the rule base. Likewise, the updater also can include a statistical learning engine based for instance on Bayesian statistics to update a statistical model to be used by classifiers. Alternatively, or in addition, the solution engine can use a similarity-based engine to find solutions by checking the solutions used for similar past cases. The invention then provides for using a prototype case induction engine to generate prototypical cases to relieve the solution engine from having to search the entire case base in every situation.

The solution engine can also be updated by a subject matter expert who manually injects prior knowledge in the form of rules or prototypical cases via an appropriate user interface. This prior knowledge represents signatures of known problems that can be tied to the knowledge documents solving them, and allows development of the solution engine to be bootstrapped. As the solution engine experiences new cases this prior knowledge will be subsumed by the automatically-generated knowledge. In addition, statistics can be kept about the performance of this prior knowledge (for instance, the number of times a rule or prototypical case successfully recommends the correct solution) to reward its author or ask them to modify it.

In another aspect the invention provides a computer support method comprising: applying plural solution functions in parallel to diagnostic data; calculating a confidence factor from the results of the plural solution functions; if the confidence factor does not meet predefinable criteria, triggering an expert review of the results prior to the delivery; and delivering the results either directly, if the confidence factor is acceptable, or following modification by an expert, if not, without direct contact between the expert and the customer.

The present invention effectively integrates human expertise into a highly automated remote computer service system. The expert has the advantage of working from an automatically generated solution. The customer benefits from both the automatic and expert contributions to the solution. The automatic solution engine benefits from the updates resulting from the expert's intervention. These and other features and advantages of the invention will be apparent from the description below with reference to the following drawings.

BRIEF DESCRIPTION OF THE DRAWINGS

An embodiment of the invention will now be described by way of example only, with reference to the accompanying drawings, wherein.

DETAILED DESCRIPTION

Figure 1:
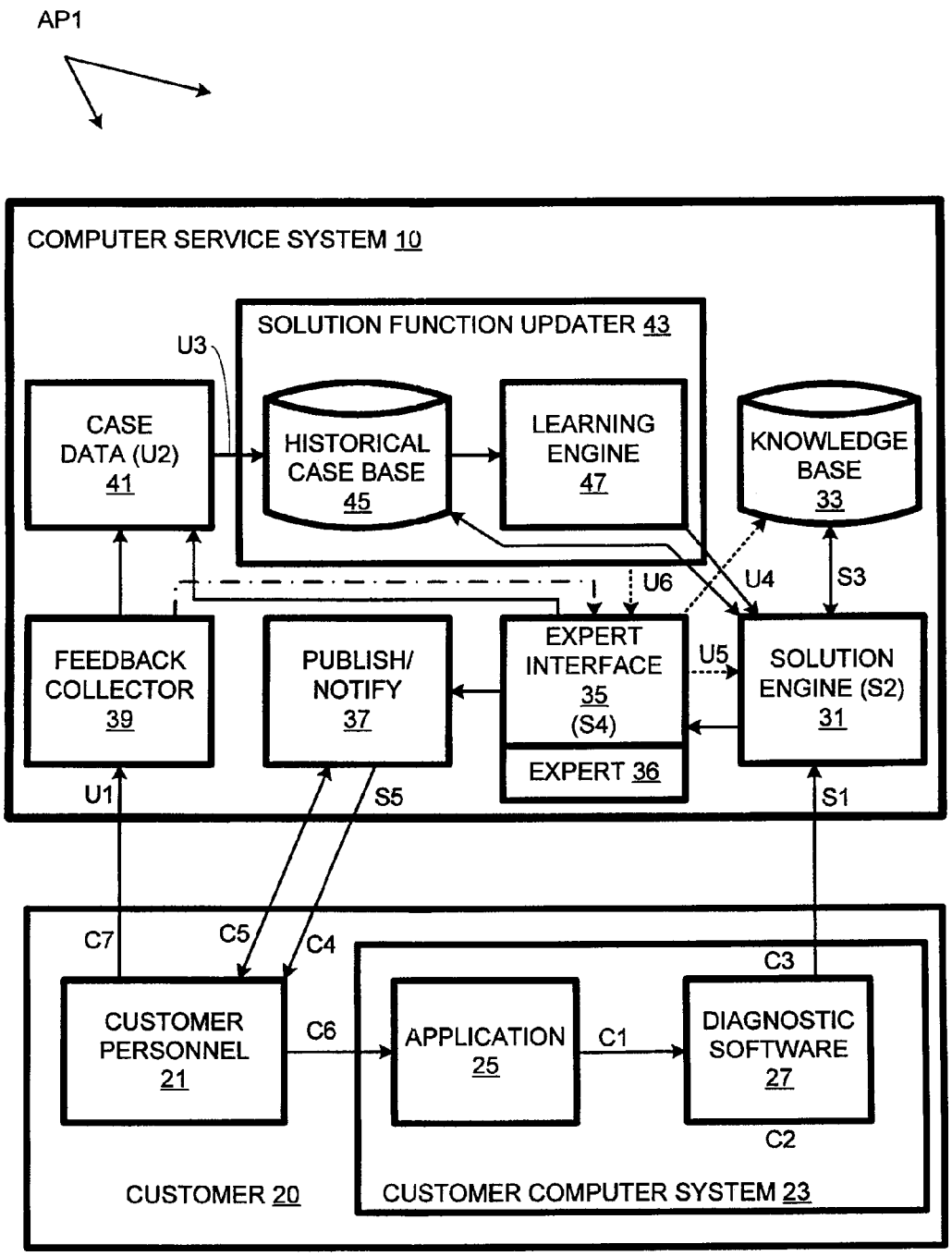
FIG. 1 is a schematic block diagram of a computer service system in an embodiment of the present invention.

In accordance with an embodiment of the present invention, a vendor AP1 provides a computer support system 10 for remote customers including customer 20. Customer 20 includes personnel 21, e.g., computer users and computer support personnel, and a computer system 23. Computer system 23 runs software including an application 25 and diagnostic software 27. Diagnostic software 27 gathers system data on an ongoing basis while monitoring application 25. When diagnostic software 27 detects an error or fault in application 25, it gathers further data relating to the fault. In addition, diagnostic software 27 can permit a user to enter natural-language textual data regarding the fault. The user-added fault-related data, the automatically gathered fault-related data, and the data collected on an ongoing basis are then packaged as "diagnostic data", which is transmitted to support system 10 for analysis.

Support system 10 includes a solution engine 31, a knowledge base 33, an expert interface 35 for expert review, a delivery function 37, a feedback collector 39, a case data record generator 41, and a solution function updater 43. Solution function updater 43 includes an historical case base 45, and a learning engine 47. Of these, only expert interface 35 requires human support personnel; the remaining illustrated vendor components are automated (although some are subject to manual updates).

Solution engine 31 generates proposed solutions from the diagnostic data received from diagnostic software 27. More specifically, solution engine 31 generates document identifiers and associated confidence levels as a solution function of the diagnostic data. The document identifiers refer to documents. The documents can present simple fixes, guide a user through a trouble-shooting procedure, etc. The documents can include links to patches and other files that can be downloaded and used in implementing solutions. For the most part, these documents are stored in knowledge base 33; however, solution engine 31 can access other sources of documents in generating a solution. Although it is not necessary for solution engine 31 to have the actual documents, it preferably collects them from knowledge base 33 or elsewhere so they are readily available in the event of expert review.

The document confidence levels indicate, for each document identified in response to a given set of diagnostic data, the likelihood that that document is an effective solution for the customer problem. Solution engine 31 calculates from the document confidence levels an overall confidence level that an effective solution can be found among the collection of documents. If the overall confidence level falls below some specified threshold, expert review is triggered.

Expert review via interface 35 determines whether the overall confidence threshold is met. For one example, if the confidence that at least one of the documents in the automatically generated solution provides an effective solution is below 90%, expert review is triggered. The threshold can be adjusted to match available expert resources. If the confidence level falls below the threshold, the automatically generated solution can be flagged for expert review. Then the diagnostic data and solution are provided to an expert who can change the solution. If the confidence level is sufficiently high, the automatically generated solution can be provided to customer without expert review.

If expert review is triggered, a human "expert" is provided with the diagnostic data and the automatically generated solution. The human expert can search knowledge base 33 using keyword and natural language queries to obtain additional solution documents. The human expert can also remove documents determined to be irrelevant to the customer problem. If a problem is not addressed by a document, the expert can generate a document, and add it to the solution set and to the knowledge base. If the review is unable to improve upon the automatically generated solution, the latter is adopted as the expert solution. The proposed solution is the expert solution if expert review was triggered; otherwise the proposed solution is the automatically generated solution. If expert review resulted in no changes, the automatically generated solution and the expert solution are the same.

Delivery function 37 then "delivers" a proposed solution to customer 20. To this end, the delivery solution can be "published" on a secure website. Delivery function 37 sends an email to a contact person of customer 20. The email contains a link to the publication site, which can be accessed by the contact after a validation procedure. Once the publication site is accessed, the customer can review the delivery solution documents. The customer can choose to implement a solution described in one of the documents or request additional expert help, e.g., phone access to support personnel. In either event, the contact is provided an opportunity to provide feedback to vendor AP1 via feedback collector 39.

Customer feedback is received by feedback collector 41. The feedback can include not only feedback provided as such, but also an indication whether expert help was requested, which is taken as negative feedback on the proposed solution. Case data function 41 then correlates the feedback with the diagnostic data and the automatically generated, expert, and post-delivery solutions to provide a data object corresponding to the case at hand. The data object is then entered into historical case base 45, where the data relating to other support cases and to vendor-generated test cases have been collected. Historical case base 45 is part of solution function updater 43, which updates solution engine 31 as new cases are handled.

Figure 2:
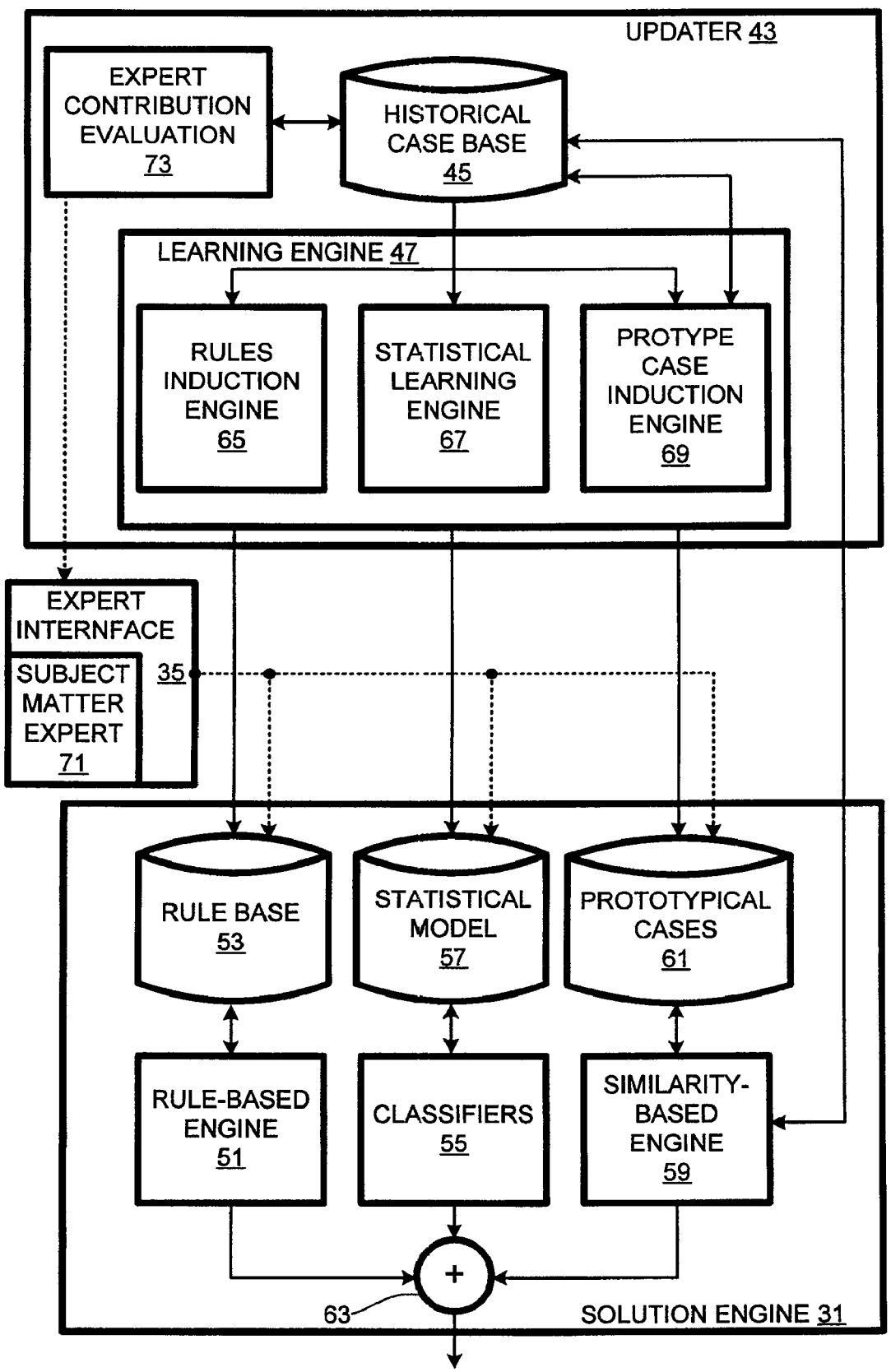
FIG. 2 is a schematic block diagram of a solution engine and a learning engine of the system of FIG. 1.

Solution engine 31 combines the results of plural artificial-intelligence approaches so that the weaknesses of one can be overcome by the strengths of another. As shown in FIG. 2, solution engine 31 includes a rule-base engine 51 that accesses a rule base 53, a classifier engine 55 that accesses a statistical model 57, and a similarity-based engine 59 that accesses a database of prototypical cases 61 (as well as the complete case base). Each engine 51, 55, and 59, provides its own partial solution. Solution combiner 63 combines the individual solutions, adjusting document confidence levels according to the number of individual solutions they appear in. For example, solution combiner 63 can increase the confidence levels for documents selected by two or three engines relative to those selected by only one of the three engines. Solution combiner 63 also computes an overall confidence level from the document confidence levels.

Each solution engine branch has an associated component in learning engine 47 of updater 43. A rules induction engine 65 analyzes data in historical case base 45 to generate new rules to be added to rule base 53 and also to retire rules as they become outmoded. Statistical learning engine 67 statistically analyzes (e.g., using Bayesian statistics) the contents of historical case base 45 to update statistical model 57.

In general, as indicated by the line between case base 45 and similarity-based engine 59 that bypasses learning engine 47, a similarity-based engine does not require a separate learning engine as it directly accesses an historical case base. In practice, it is helpful to generate prototype cases to save the time required to search large numbers of very similar cases. Thus, learning engine 47 includes a prototype case induction engine 69 that generates prototypical cases for storage in prototypical case base 61.

In addition to automatic updating of the solution function, an expert can update the solution function manually, as indicated by dotted lines from expert interface 35 to solution engine 31 in FIGS. 1 and 2. The expert that updates solution function can also be involved in solution review or can be a dedicated (and, perhaps, more highly trained) subject-matter expert 71, as indicated in FIG. 2. As illustrated, subject-matter expert 71 uses the same expert interface 35 as would a review expert; alternatively, separate interfaces can be provided for review and manual updating. As part of the updating process, a subject-matter expert typically contributes documents to knowledge base 33, as indicated by the dotted line from expert interface 35 to knowledge base 33 in FIG. 1.

Expert contributions, e.g., manually entered rules and prototypical cases, are tracked as they are employed in automatically generated solutions. The expert contributions are further evaluated for effectiveness, e.g., an expert contribution evaluation function 73, FIG. 2, tallies the instances in which an expert contribution effectively addresses a customer problem. The evaluation can be provided to subject-matter expert 71 that made the contribution via interface 35. If the contribution is successful, the expert can be rewarded. If the evaluation is negative, the expert can be asked to modify the contribution.

Figure 3:
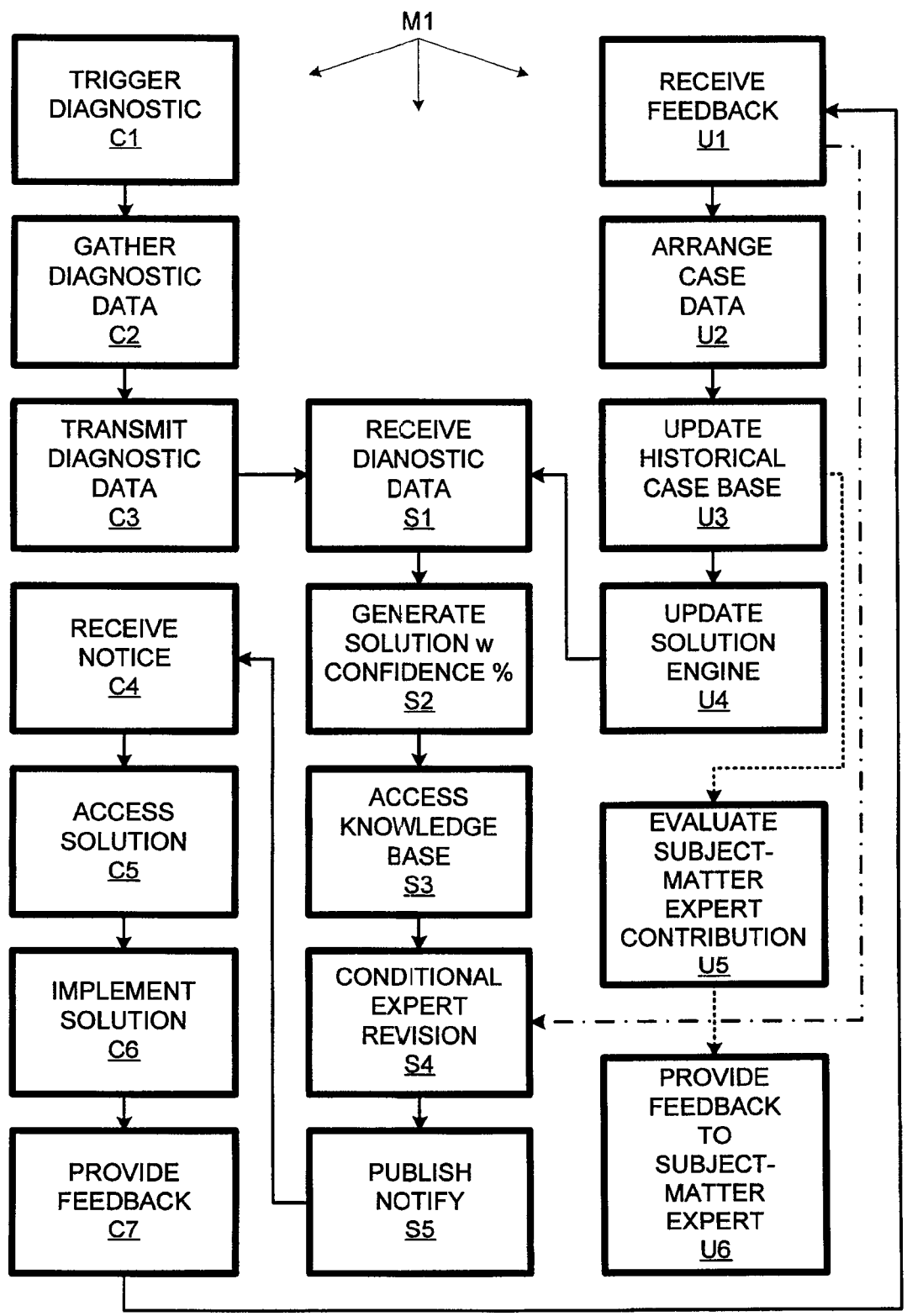
FIG. 3 is a flow chart of a method of an embodiment of the invention practiced in the context of the system of FIG. 1.

The embodiment provides for support method M1, as shown in FIG. 3. Method M1 can be conceptually divided into three sequences of steps, customer steps C1-C7, solution steps S1-S5, and support-system update steps U1-U4. At step C1, some triggering event starts the diagnostic process. This can be a detected fault, some configuration change, or a scheduled maintenance event, for instance. At step C2, diagnostic data is collected. This normally involves capturing state data in temporal proximity to a triggering fault, but also can include routinely collected data, such a configuration data, command usage, etc. Step C2 also provides for packaging the data in a format expected by vendor 20. At step C3, the diagnostic data is transmitted to vendor 20. Steps C4-C7 are performed after solution sequence S1-S5.

At step S1, vendor 20 receives the diagnostic data. In step S2, solution engine 31 generates a solution including a set of documents with document confidence levels assigned to the individual documents and a solution confidence level assigned to the automatically generated solution; in other words, a collective confidence level is assigned to the set of documents constituting a solution. The solution documents are retrieved from knowledge base 33 at step S3.

At step S4, expert review via interface 35 checks the solution confidence level. If it is above a predetermined threshold, expert review can be omitted or conducted on a random basis. If the solution confidence level is below threshold, the diagnostic data and the automatically generated solution are presented to an expert for review. When reviewing an automatically generated solution, an expert can add documents (creating new documents if necessary), delete documents, and revise confidence levels. The end result of the expert review is an expert solution.

The expert solution (if there was an expert review) or the automatically generated solution (if there was no expert review) is delivered to customer 20. In the present embodiment, delivery function 37 "publishes" solution documents on a secure website controlled by vendor 10 at step S5. Also at step S5, delivery function 37 notifies a contact person of customer 20 by email of the availability of the solution. The email can contain a link (or directions) for accessing the publication site. Activating the link initiates a validation procedure, which if successfully negotiated, provides the customer contact with access to the publication site and, thus, the solution at step C5.

Having accessed the solution documents, customer 20 can implement the solution at step C6. Implementation can involve following instructions in one or more solution documents. However, customer 20 can elect to not implement any solution. For cases in which the customer does not implement a solution or in which implementation is unsuccessful, the solution site includes a link that provides access to instant message or phone support.

Customer 10 provides feedback at step C7. The feedback can be explicit, including answers to questions posed at the site. Also, observing usage patterns—which documents were looked at and for how long, which ones were downloaded, etc., can provide feedback. Feedback collector 39 at step U1 collects the feedback. If the feedback indicates there was no successful solution, feedback collector can return method M1 for a second expert review or a synchronous support session.

Once the case is complete, i.e., no more information is to be provided by vendor 10 to customer 10 regarding the case, the case data is gathered at step U2. The case data includes the original diagnostic data, additional diagnostic data that may have been collected during a synchronous session, the automatically generated solution, any changes to the automatically-generated solution via a pre-delivery expert review (these changes can be implicit in a description of the expert solution), and feedback, including usage data, implementation feedback, etc. Once the case data is collected, it is stored in case base 45 at step U3.

Learning engine 47 accesses case base 45 to analyze case base 45 and update solution engine 31 at step U4. For example, rule induction engine 65 can analyze current case data to update existing rules and perhaps retire rules that have not been used for some set time. For maximum effectiveness, updates can be performed every time case-base 45 is updated. However, in the interests of efficiency, updates could be less frequent. In addition, the frequency of updates can vary according to the branch of the learning engine, e.g., the frequency with which rules are updated need not be the same as the frequency with which new prototype cases are generated.

In addition to automatic updates, method M1 provides for manual updates by a subject matter expert at step U4. These can involve manually entered rules and prototypical cases and are typically accompanied by documents added to knowledge base 33. When expert contributions are employed in automatically-generated solutions, their effectiveness is evaluated at step U5, e.g., by tallying the number of times an expert contribution results in a successfully implemented solution. The evaluation can be fed back, at step U6, to the contributing expert, who can be rewarded for successful solutions. In addition, a contributing expert can be asked to modify contributions that are negatively evaluated.

While in the illustrated example, the customer computer is a general-purpose computer, the invention also provides for special purpose computers and embedded computers with built-in diagnostic data collection that can be communicated to a remote support site. While in the illustrated example, a solution comprises a set of documents, in other embodiments, solutions can also include executable files, e.g., to be downloaded and run on the computer that suffered the problem being addressed.

The present invention has industrial applicability in the servicing of computer systems, for instance. The vendor may be a department of customer, a manufacturer of an application, or a third-party support vendor. These and other modifications to and variations are provided by the present invention, the scope of which is defined by the following claims.

The invention claimed is:

1. A computer support method comprising:
   applying plural solution functions in parallel to diagnostic data from a computer system being monitored;
   calculating a confidence factor from the results of the plural solution functions;
   if the confidence factor does not meet predefinable criteria, triggering an expert review of the results prior to delivery of the results to the computer system; and
   delivering the results either directly or following modification by an expert to the computer system without direct contact between the expert and a computer system operator,
   wherein the confidence factor indicates a likelihood that the results will be an effective solution for addressing a problem to which the diagnostic data is related.

2. A method as claimed in claim 1 wherein one said plural solution functions employs a rule-based approach.

3. A method as claimed in claim 1 wherein one of said plural solution functions employs a classification approach.

4. A method as claimed in claim 1 wherein one of said plural solution functions employs a similarity-based approach.

5. A method as claimed in claim 1, wherein the predefinable criteria comprises a threshold value that the confidence factor is to meet before delivering the results without expert review.

6. A method as claimed in claim 3 wherein said similarity-based approach accesses prototype cases.

7. A computer support system comprising:
   a solution engine for generating a result from diagnostic data by combining plural solutions generating using distinct artificial-intelligence approaches, said solution engine assigning a confidence factor to said result;
   an expert review function for providing said result to an expert for review if said confidence level fails to meet predefinable criteria;
   delivery means for delivering said result to a customer directly if said confidence factor meets said criteria and after modification by said expert if said confidence factor fails to meet said criteria without direct contact between the expert and the customer,
   wherein the confidence factor indicates a likelihood that the results will be an effective solution for addressing a problem to which the diagnostic data is related.

8. A method as claimed in claim 7 wherein said solution engine includes a rule-based engine.

9. A method as claimed in claim 7 wherein said solution engine includes a classification engine.

10. A method as claimed in claim 7 wherein said solution engine includes a similarity based engine.

11. A method as claimed in claim 10 wherein said similarity-based engine also includes a database of prototype cases.

12. A computer support system comprising:
    a solution engine for generating a result from diagnostic data by combining plural solutions generating using distinct artificial-intelligence approaches, said solution engine assigning a confidence factor to said result;
    an expert review function for providing said result to an expert for review if said confidence level fails to meet predefinable criteria;
    delivery means for delivering said result to a customer directly if said confidence factor meets said criteria and after modification by said expert if said confidence factor fails to meet said criteria without direct contact between the expert and the customer,
    wherein the predefinable criteria comprises a threshold value that the confidence factor is to meet before delivering the results without expert review.

13. A method as claimed in claim 12 wherein said solution engine includes a rule-based engine.

14. A method as claimed in claim 12 wherein said solution engine includes a classification engine.

15. A method as claimed in claim 12 wherein said solution engine includes a similarity based engine.

16. A method as claimed in claim 15 wherein said similarity-based engine also includes a database of prototype cases.

* * * * *